Sept. 26, 1967

C. W. KULIG 3,344,245

BODY GAGING APPARATUS FOR GLASS CONTAINERS

Filed Sept. 24, 1965

INVENTOR.
CONSTANTINE W. KULIG
BY
McCormick, Paulding & Huber
ATTORNEYS

Sept. 26, 1967  C. W. KULIG  3,344,245
BODY GAGING APPARATUS FOR GLASS CONTAINERS
Filed Sept. 24, 1965  3 Sheets-Sheet 2
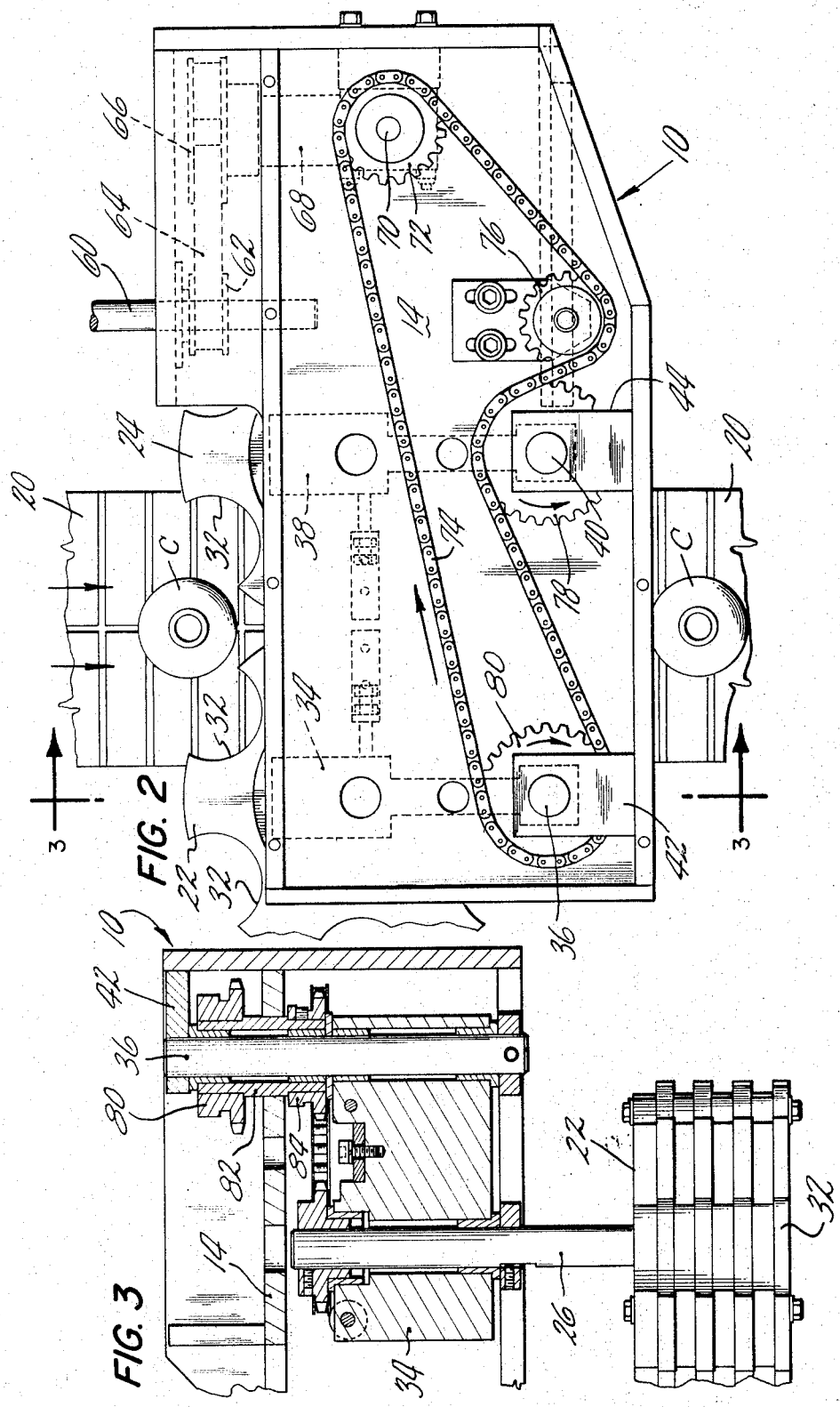

United States Patent Office 3,344,245
Patented Sept. 26, 1967

3,344,245
BODY GAGING APPARATUS FOR GLASS CONTAINERS
Constantine W. Kulig, Windsor, Conn., assignor to Emhart Corporation, Bloomfield, Conn., a corporation of Connecticut
Filed Sept. 24, 1965, Ser. No. 489,891
10 Claims. (Cl. 200—61.41)

This invention relates to a machine or apparatus for gauging the body width dimension of containers, particularly glass containers.

As the description of the invention proceeds, it will be seen that the apparatus described is particularly adapted to detect the presence of an oversized glass container in a line of coontainers being inspected. However, it is a phenomenon of modern glassware making equipment that when a container is molded with a body which is oversize in one region, it is almost always undersized in another region. Therefore, it can be said that this invention provides apparatus for detecting the presence of a glass container having an improper body width dimension by finding an oversized portion of the body.

It is the general object of the invention to provide an apparatus that operates automatically to detect oversized containers in a line of containers being moved on a conveyor by inspecting each one of them at speeds in keeping with the speed of glassware production and with a minimum of glass handling so that the line of containers passed will be suitable for users to thereafter label and to fill and to cap.

As will be described in greater detail, the apparatus provided in accordance with this invention includes a pair of rotatable gauging wheels, one such wheel being located on each side of an advancing line of containers standing on a conveyor. The wheels are provided with regularly spaced peripheral pockets which mate with each other. That is, when the wheels are rotated in approximate tangential relationship, the pockets on the respective wheels oppose each other so as to at least partially embrace each container in the passing line. These pockets are formed generally complementary to the body shape of the containers, and the wheels are rotatably supported on blocks or other means which are relatively movable toward and away from each other. The blocks or other supporting means are biased toward each other, and stops are provided to space the wheel axes the required distance for gauging containers having a desired body diameter or body width in the case of paneled body containers. When an oversized container is embraced by the wheel pockets, the wheel supporting blocks are spread apart against the bias urging them toward each other. This relative spreading movement is used to actuate electrical switch means which will provide a signal indicating the presence of an unfit, oversized container. This signal is imposed upon conventional electrical circuitry forming a part of a "memory" system, and as the faulty container moves away from the gauging wheels, the signal is employed to energize a solenoid operated plunger or other reject mechanism for removing the unfit container from the advancing line.

The drawings show a preferred embodiment of the invention and such embodiment will be described, but it will be understood that various changes may be made from the construction disclosed, and that the drawings and description are not to be construed as defining or limiting the scope of the invention, the claims forming a part of this specification being relied upon for that purpose.

Of the drawings:

FIG. 2 is a top view of the inspecting or gauging apparatus with the top cover removed therefrom to reveal details of interior construction, the view being taken generally as indicated by the line 2—2 of FIG. 1;

FIG. 3 is a vertical sectional view taken as indicated by the line 3—3 of FIG. 2.

Figure 1:
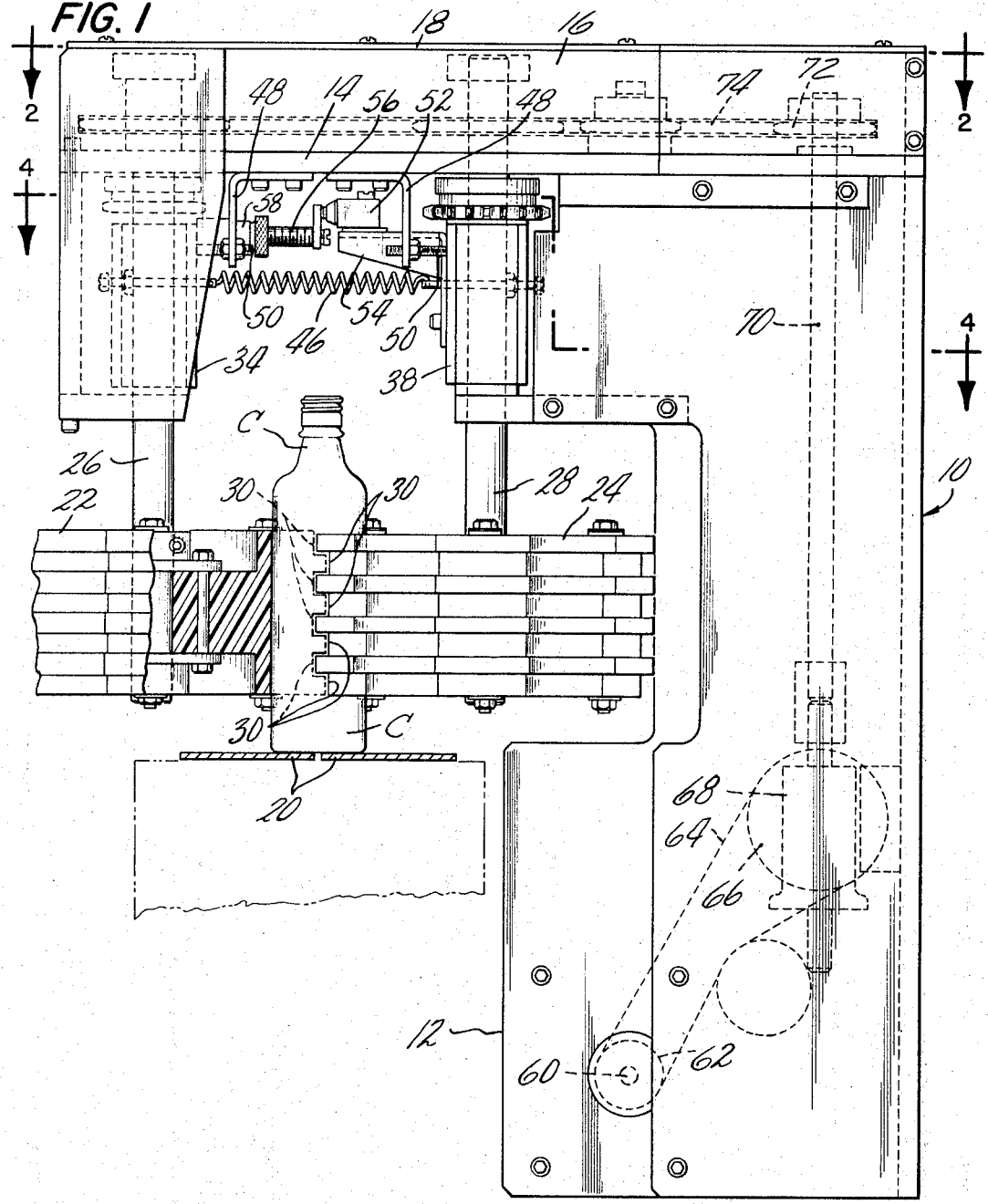
FIG. 1 is a side elevational view of the container inspecting apparatus provided in accordance with the present invention, the view being taken transversely of a conveyor associated with the apparatus to advance a standing line of containers therethrough.
Figure 4:
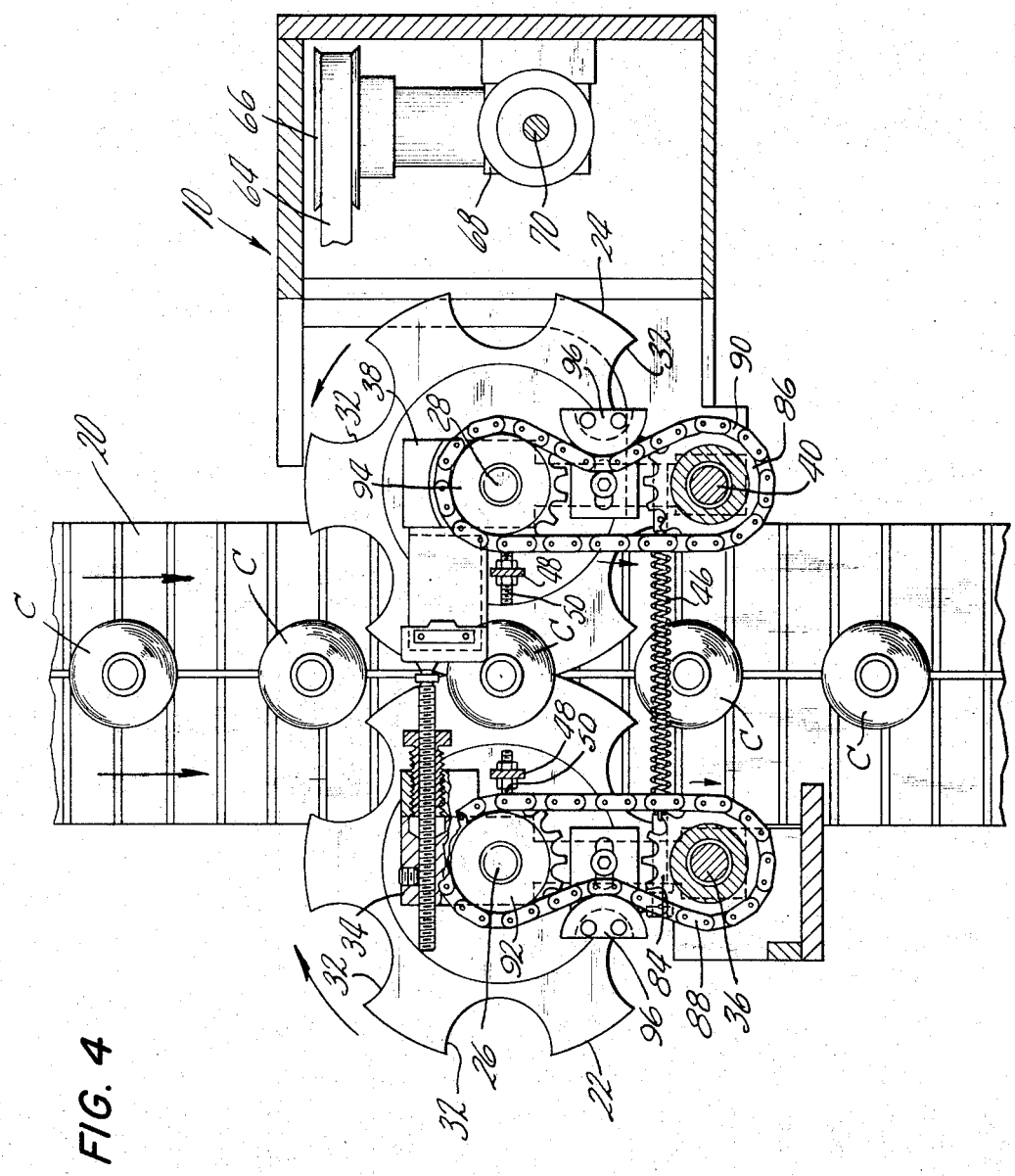
FIG. 4 is an irregular horizontal sectional view taken as indicated by the line 4—4 of FIG. 1.

As shown in FIG. 1, the container body gauging machine provided in keeping with this invention includes a frame 10 comprising a base and bottom cabinet portion 12, which can be mounted on the conveyor frame or which can be supported from the floor, a cantilever platform or shelf 14, and an upper cabinet section 16 which is closed by a detachable cover 18. The cantilever platform 14 extends horizontally forwardly from the main portion of the frame 10 and thus projects over a driven horizontal conveyor 20 moving across the front of the bottom cabinet or base portion 12 of the frame in the direction of the arrows shown in FIGS. 2 and 4. This conveyor transports glass containers or the like C, C which stand generally in a line on the conveyor 20 in evenly spaced apart relationship. These containers may have already been inspected for defects other than in body width dimension in a container inspection machine of the type shown in the co-pending U.S. patent application of Robert Spurr, Ser. No. 484,190, filed Sept. 1, 1965. If the apparatus of this invention is used in association with such container inspection machine, the conveyor 20 may be driven by such machine and the drive for the apparatus of this invention may be taken from a take-off shaft from such machine. Otherwise, a single drive motor can be used to drive this apparatus and the conveyor 20 in timed relationship, or separate drive means may be employed so long as the apparatus to be described is driven in timed relationship with the speed of the conveyor 20.

As best shown in FIGS. 1 and 3, the machine or apparatus provided by this invention includes a pair of gauging wheels 22 and 24 which are secured to the lower ends of shafts 26 and 28, respectively, the said shafts being vertically disposed to depend from that portion of the machine which overhangs the conveyor 20. It will be seen that the shafts 26 and 28 are located on opposite sides of the advancing line of containers C, C so that the wheels 22, 24 will be disposed in approximately tangential relationship with the point or vertical line of approximate tangency being on and intersecting the line of advance of the containers so that the said line of approximate tangency will coincide with the vertical centerline of each container C as it is located in inspecting position between the wheels.

It is said that the wheels are in "approximate tangency" because they overlap each other a slight amount. That is, each of the wheels 22 and 24 is provided with vertically spaced peripheral notches 30, 30, the notches on the wheel 22 being vertically staggered from the notches on the wheel 24 so that the said wheels will overlap as shown in FIG. 1.

In addition, each of the said gauging wheels is provided with a curcumaxial series of peripheral pockets 32, 32 which are complementary to the body shape of the containers being inspected. In the embodiment illustrated, the pockets 32, 32 on each wheel are of semi-circular shape and have a span substantially equal to the diameter of the cylindrical containers C, G so as to be complementary thereto. The pockets 32, 32 on the wheel 22 are identical to and mate with the pockets 32, 32 on the wheel 24. That is, the said pockets on the respective wheels are so arranged that they will cooperate to at least partially embrace each of the series of containers C, C in the passing line on the conveyor 20 when the said gauging wheels are rotated in the approximately tangential or overlapped relationship shown. In order to embrace each passing container in the line, the wheels are driven (by means to be described) to rotate at equal speed and in opposite directions as indicated by the arcuate arrows in FIG. 4. Further, the wheels are rotated at a speed in keeping with the speed of movement of the conveyor so as to provide a peripheral speed at their approximate point of tangency on the line of advance of the containers which is equal to the speed of the conveyor and in the same direction.

It is an important operative feature of this apparatus that the gauging wheels 22 and 24 are mounted for relative movement toward and away from each other so that relative movement away from each other can be used to detect the presence of an oversized container being inspected or gauged. In order to provide for such relative movement, the shaft 26 for the wheel 22 is journaled in a block 34 which is supported for pivotal movement on a shaft 36, and the shaft 28 for the wheel 24 is journaled in a block 38 which is supported for pivotal movement on a shaft 40. The blocks 34 and 38 extend longitudinally of the conveyor 20 on opposite sides of the advancing line of containers with the pivot shafts 36 and 40 of said blocks disposed relatively downstream and with the wheel shaft 26 and 28 disposed relatively upstream. The pivot shafts 36 and 40 are fixed in laterally extending brackets 42 and 44, respectively, which extend inwardly from the frame 10 in the upper cabinet portion 16 thereof, and the said pivot shafts extend vertically downwardly below the cantilever platform 14 so that the blocks 34 and 38 are supported below said platform for pivotal movement toward and away from each other and thus toward and away from the advancing line of containers. The blocks are urged toward each other by a spring 46 (FIGS. 1 and 4) extending therebetween, but the movement of the blocks toward each other is limited by stop means.

The said stop means comprises a pair of L-shaped brackets 48, 48 which are secured to the underside of the platform 14 to provide an arm extending downwardly. Each downwardly extending arm receives an adjustable stop screw 50 which will engage an associated block 34 or 38 to limit its inwardly swinging movement. The top screws 50, 50 can be adjusted in the brackets 48, 48 to adjust the span or diameter of the mating pockets 32, 32 in the wheels 22 and 24 so that the said pockets will be properly spaced to accommodate containers C, C of a known desired diameter. It will be seen that the stop screws 50, 50 limit the biased movement of the blocks 34 and 38 to positions wherein the wheel shafts 26 and 28 are substantially equidistant from the line of container advance.

It is rather obvious that a container having an oversized body width dimension will tend to separate the wheels 22 and 24 and thus to spread the blocks 34 and 38 when the said wheels embrace the said container. This relative spreading movement of the blocks is used to operate switch means which will provide a signal indicating the presence of an oversized container between the wheels. The presently preferred switch means comprises an electrical switch 52 carried by a bracket 54 extending inwardly or toward the line of advance from the block 38. A switch actuator 56 is carried on a bracket 58 extending inwardly from the other block 34 so as to engage and actuate the switch 52. The actuator 56 is threaded into the bracket 58 so as to adjust its inwardly extending length. The actuator is adjusted to engage the switch 52 when the blocks 34 and 38 are against the stops 50, 50, and the actuator is adjusted so as to disengage and thus actuate the switch 52 when the blocks 34 and 38 have been spread a predetermined or preselected distance. This provides for the oversized tolerance permitted for the containers C, C, the actuator 56 being adjusted to energize the switch 52 at a precise oversize dimension.

It has been mentioned that the wheels 22 and 24 are to be rotated at equal speed and in opposite directions so as to provide a peripheral speed and direction in keeping with that of the conveyor 20. This is done so that the pockets 32, 32 on the respective gauging wheels will engage and inspect each of the series of containers C, C spaced apart in the line on the conveyor. Thus, the spacing of the containers in the line being appropriate for engagement by the pockets, the containers are engaged and inspected without holding up the line and, in fact, the gauging wheels can actually facilitate movement of the containers with the conveyor.

The drive means used to thus rotate the gauging wheels includes a drive shaft 60 (FIGS. 1 and 2) which can be driven by an independent electric motor or the lke or which can be a driven shaft extending from an inspection machine of the type mentioned hereinbefore. The shaft 60 extends horizontally into the lower cabinet portion 12 of the frame 10, and it has a pulley 62 secured to its inner end portion to drive a belt 64. The pulley 62 is an adjustable or "timing" pulley, and its belt 64 is entrained over a pulley 66 mounted on a shaft extending into a gear box 68. The gear box 68 has an output shaft 70 extending vertically upwardly in the frame 10 through a suitable opening in the platform 14. A sprocket 72 is secured to the upper end of the shaft 70 over the platform 14 to drive an endless chain 74 which moves in a horizontal plane.

As seen in FIG. 2, the chain 74 is entrained around an adjustable idler sprocket 76 which adjusts the slack on the chain which also passes in opposite directions around sprockets 78 and 80 which are rotatable on the block pivot shafts 40 and 36, respectively. It will be seen that the sprocket 78 is driven in a counterclockwise direction and the sprocket 80 is driven in a clockwise direction as viewed in FIG. 2. As shown in FIG. 3, the sprocket 80 is secured to a sleeve 82 on the block pivot shaft 36 for the block 34, and this sleeve projects downwardly through the platform 14 and a driving member 84 is secured to its lower end. A similar sleeve arrangement is provided in association with the sprocket 78 so that a similar driving member 86 will be associated with the block 38.

In preferred form, the driving members 84 and 86 are sprockets which transmit rotary motion to the wheels 22 and 24, respectively, by endless chains 88 and 90 which are entrained over sprockets 92 and 94 secured to the wheel shafts 26 and 28, respectively. It will be noted that adjustable chain tighteners 96, 96 are mounted on the blocks 34 and 38 to adjust the slack in the respective chains. It will be noted in FIG. 4 that as the drive pulleys 84 and 86 are rotated clockwise and counterclockwise, respectively, their associated gauging wheels 22 and 24 are also rotated clockwise and counterclockwise, respectively.

It is important to observe that with the drive arrangement described, the gauging wheels 22 and 24 will continue to be rotated at the same speed and pocket mating arrangement even when the blocks 34 and 38 are separated by an oversized container. Thus, there is no interruption in the timing of the mechanism, and this is achieved due to the fact that the drive sprockets 84 and 86 are rotated on the axes of the respective pivoted wheel support blocks 34 and 38, and because all sprockets in the drives for the respective wheels are of the same pitch diameter.

The invention claimed is:

1. An apparatus for gauging the body width dimension of glass containers or the like and comprising a pair of approximately tangential gauging wheels which are provided with mating peripheral pockets which are generally complementary to the body shape of the containers so as to at least partially embrace them, a drive for rotating the wheels at equal speed and in opposite directions, at least one of said wheels being mounted for movement away from the other as a result of an oversized container being embraced by their mating pockets, means biasing said one wheel toward the other, means operable upon movement of the one wheel away from the other wheel to indicate the presence of an oversize container between the wheels, and means for feeding containers in sequence for gauging by the wheels.

2. An apparatus gauging the body width dimension of glass containers or the like and comprising, a pair of approximately tangential gauging wheels each of which has a series of peripherally spaced pockets which are generally complementary to the body shape of the containers to mate with the similar pockets on the other wheel and to at least partially embrace containers therein in sequence, a drive for rotating the wheels at equal speed and in opposite directions, means mounting at least one of said wheels for movement away from the other as a result of an oversized container being embraced by mating pockets, means biasing said one wheel toward the other, means operable upon movement of the one wheel away from the other to signal the presence of an oversized container between the wheels, and means for feeding containers in sequence for gauging by the wheels.

3. An apparatus for gauging the body width dimension of glass containers or the like standing generally in a line on a driven horizontal conveyor and comprising a pair of approximately tangential gauging wheels rotatable on substantially vertical axes which are substantially equally spaced on opposite sides of the line of containers, said wheels being provided with mating peripheral pockets which are generally complementary to the body shape of the containers so as to at least partially embrace them in sequence as the line advances and as the wheels are rotated, a drive for rotating the wheels at equal speed and in opposite directions to provide a peripheral speed at their approximate point of tangency substantially equal to the rate of the conveyor and in the same direction, at least one of said wheels being mounted for movement away from the other as a result of an oversized container being embraced by mating pockets, means biasing said one wheel toward the other, and means operable upon movement of the one wheel away from the other wheel to indicate the presence of an oversize container between the wheels.

4. An apparatus for gauging the body width dimension of glass containers or the like standing generally in a line on a driven horizontal conveyor and comprising a pair of approximately tangential gauging wheels rotatable on substantially vertical axes which are substantially equally spaced on opposite sides of the line of containers, said wheels being provided with mating peripheral pockets which are generally complementary to the body shape of the containers so as to embrace them in sequence as the line advances and as the wheels are rotated, a drive for rotating the wheels at equal speed and in opposite directions to provide for a peripheral speed at their approximate point of tangency in keeping with the rate of the conveyor and in the same direction, both of said wheels being mounted for movement away from each other as a result of an oversized container being embraced by mating pockets, a spring biasing said wheels toward each other, and an electrical switch operable upon relative movement of said wheels away from each other to provide a signal indicating the presence of an oversized container between the wheels.

5. An apparatus for gauging the body width dimension of glass containers or the like standing generally in a line on a driven horizontal conveyor and comprising a pair of gauging wheels having mating peripheral pockets which are generally complementary to the body shape of the containers so as to at least partially embrace them, a pair of blocks mounted for pivotal movement on vertical axes which are substantially equally spaced on opposite sides of the line of containers, each such block rotatably supporting a respective gauging wheel on a vertical axis spaced from the pivot axis of the block, spring means biasing said blocks toward each other to bring said wheels into approximately tangential relationship at a point over the line of advance of the containers, a rotatable driving member located on each block pivot axis, motion transmitting means interconnecting the driving member and gauging wheel associated with each block to rotate the latter, means for rotating the two driving members simultaneously to rotate the two gauging wheels in opposite directions and at a peripheral speed at their approximate point of tangency in keeping with the speed of the conveyor whereby the gauging wheels will embrace the passing containers in sequence and the blocks will be spread relatively apart as a result of the wheels engaging an oversized container, and an electrical switch operable upon such relative spreading movement of the blocks to provide a signal indicating the presence of an oversize container between the wheels.

6. An apparatus for gauging the body width dimension of glass containers or the like standing generally in a line on a driven horizontal conveyor and comprising a pair of gauging wheels rotatable on substantially vertical axes which are substantially equally spaced on opposite sides of the line of container advance, the said wheels being arranged approximately tangential to each other but being provided with vertically spaced peripheral notches which are staggered from each other to permit the marginal peripheral portions of the wheels to overlap each other as the wheels are rotated, the wheels being further provided with mating peripheral pockets which are generally complementary to the body shape of the containers so as to at least partially embrace them in sequence as the line advances and as the wheels are rotated, a drive for rotating the wheels at equal speed and in opposite directions to provide a peripheral speed at the point on the line of advancing containers substantially equal to the speed of and in the same direction as the conveyor, said wheels being mounted for relative movement away from each other as a result of an oversized container being embraced by mating pockets, a spring biasing said wheels toward each other, and an electrical switch operable upon relative movement of said wheels away from each other to provide a signal indicating the presence of an oversize container.

7. An apparatus for gauging the body width dimension of glass containers or the like standing generally in a line on a driven horizontal conveyor and comprising a pair of gauging wheels having mating peripheral pockets which are generally complementary to the body shape of the containers so as to at least partially embrace them when the wheels are rotated in approximately tangential relationship, a pair of relatively movable blocks supporting the wheels for rotation on vertical axes on opposite sides of the line of container advance, means biasing said blocks toward each other, adjustable stop means engaging said blocks to locate said wheels in approximately tangential relationship so as to embrace containers of acceptable body size without relative spreading movement of the blocks and so as to cause relative spreading movement of the blocks when an oversized container is embraced, a drive for rotating the wheels at equal speed and in opposite directions to provide a peripheral speed at the point on the line of advancing containers which is substantially equal to the speed of and in the same direction as the conveyor, and electrical switch means operable upon relative movement of the blocks away from each other to signal the presence of an oversize container.

8. A gauging apparatus as set forth in claim 7 wherein said electrical switch means comprises a switch carried by one block and an adjustable switch actuator carried by the other block and arranged to actuate said switch and to provide the said signal as a result of relative movement of the blocks away from each other a predetermined distance.

9. An apparatus for gauging the body width dimension of glass containers or the like standing generally in a line on a driven horizontal conveyor and comprising a pair of gauging wheels having vertically spaced notches which are staggered on the respective wheels to permit marginal overlap of the wheels when they are rotated on vertical axes, the wheels also having circumaxially spaced peripheral notches which mate with each other and which are generally complementary to the body shape of the containers so as to at least partially embrace containers therein when the wheels are rotated in approximately tangential relationship, a pair of relatively movable blocks supporting the wheels for rotation on vertical axes on opposite sides of the line of container advance, means biasing said blocks toward each other, stop means engaging said blocks to locate said wheels in approximately tangential relationship so as to embrace containers of acceptable body size without relative spreading movement of the blocks and to cause such spreading movement when an oversized container is embraced, a drive for rotating the wheels at equal speed and opposite directions to provide a peripheral speed at a point on the line of advancing containers substantially equal to and in the same direction as the conveyor speed, and electrical switch means operable upon relative spreading movement of the blocks to signal the presence of an oversize conveyor.

10. A gauging apparatus as set forth in claim 9 wherein said stop means is adjustable to adjust the spacing between the wheel axes to accommodate containers of selected body width dimension and wherein said electrical switch means comprises a switch carried by one block and an adjustable actuator carried by the other block and arranged to actuate said switch and to provide said signal as a result of relative spreading movement of the blocks a preselected distance.

References Cited
UNITED STATES PATENTS

| | | | |
|---|---|---|---|
| 2,352,091 | 6/1944 | Fedorchak et al. | 209—88 |
| 2,542,090 | 2/1951 | Lorenz | 209—88 |
| 2,988,218 | 6/1961 | Fedorchak et al. | 209—88 |
| 3,080,659 | 3/1963 | Wolford | 33—174 |

BERNARD A. GILHEANY, *Primary Examiner.*

H. B. GILSON, *Assistant Examiner.*